June 27, 1961   R. A. JOHNSON ET AL   2,990,021
COIL SPRING HARROW
Filed Oct. 27, 1958

INVENTORS
Robert A. Johnson
Eugene J. Birkenbach

Paul O. Pippel
ATTORNEY

2,990,021
COIL SPRING HARROW
Robert A. Johnson, Downers Grove, and Eugene J. Birkenbach, Des Plaines, Ill., assignors to International Harvester Company, Chicago, Ill., a corporation of New Jersey
Filed Oct. 27, 1958, Ser. No. 769,862
7 Claims. (Cl. 172—618)

This invention relates to harrows and more particularly to a novel harrow which utilizes spring teeth of the type having a coil wound about a generally horizontal axis with a downward directed tooth at one end.

One of the critical problems in designing a harrow of this type resides in so arranging the coil and tooth structure so that maximum flexibility is obtained and at the same time forces imposed upon the structure are effectively distributed throughout the coil so as to prevent early fatigue or failure.

In addition to the foregoing requirement it is necessary to so mount the tooth structure as to obtain varying working angles of the tooth with respect to the ground.

A further problem in constructions of this type is in the provision of an adequate frame structure such that it will properly support the teeth and at the same time have rugged durability in service.

It is a primary object of the invention to provide a novel harrow including a rigid frame-work comprising a pair of longitudinal connecting members and a plurality of transverse tooth bars connected to the connecting members. The tooth bars being in the form of angle irons with their apices directed upwardly and their cavities facing downwardly and enclosing portions of the coil springs at the upper ends of the spring teeth which depend downwardly from the tooth bars, the flanges of the tooth bars embracing the coils of the tooth structures which were arranged in pairs and interconnected by a spacing or connecting portion, said connecting portion being secured to the tooth bar by means of bolts extending through the flanges of the tooth bar and functioning as a stop for limiting pivotal movement of the tooth structures so that in one position the teeth are substantially vertical and in another position the teeth are inclined rearwardly with respect to the direction in which the harrow is being pulled.

A further object of the invention is to provide a novel connection between the tooth structure and the tooth bar such that the tooth structure is adapted to float and abut against the tooth bar through the coil of the tooth structure and with a spacing for the tooth from the tooth bar so that under operating conditions the tooth can flex fore and aft without engaging or striking the bar.

A still further object of the invention is to provide a novel connection for the spring tooth assembly with the tooth bar such that the tooth assembly pivots about the axis in the coils thereof, coils engaging the confining flanges of the tooth bar.

These and other objects of the invention will become more apparent from the specifications and the drawings, wherein.

Figure 1:
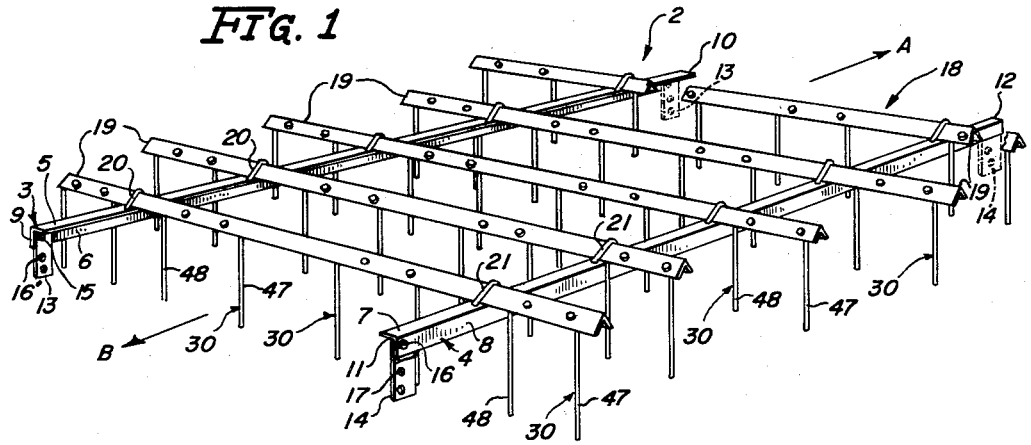
FIGURE 1 is a perspective view of our novel spring tooth harrow.
Figure 2:
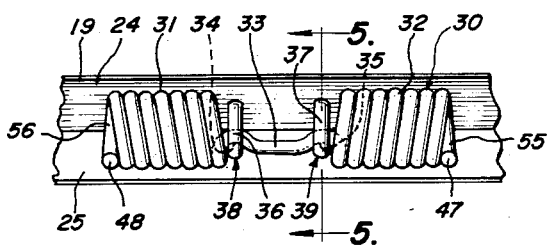
FIGURE 2 is a fragmentary enlarged bottom elevational view of a tooth structure and tooth bar.

Describing the invention in detail and having particular reference to the drawings the spring tooth harrow 2 comprises a pair of laterally spaced fore and aft longitudinal connecting members 3 and 4 preferably of angle construction, the number 3 having an inwardly directed top flange 5 and a downwardly directed flange 6 and the angle 4 having an inward directed horizontal flange 7 and a vertical downwardly directed flange 8. Opposite ends 9 and 10 and 11 and 12 of the longitudinal connecting members 3 and 4 may serve as connections for the hitching brackets 13 and 14 which clamp against the inner sides of the flanges 6 and 8 and are bolted thereto as bolts 15 and 16. The hitching members or brackets 13 and 14 are provided with suitable apertures 16′ and 17 for connection by means of any flexible linkage such as chains or cables to an associated tractive device such as a tractor.

Thus it will be realized that the implement may be drawn in either direction depending on the operator's desire as to where he mounts the attaching brackets 13 and 14. The reason for attaching these brackets to either end of the implement frame-work generally designated 18 will be hereinafter more fully described.

Figure 3:
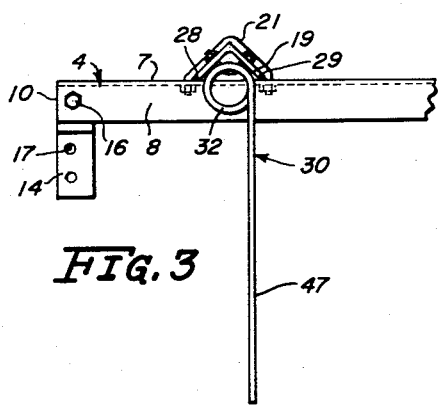
FIGURE 3 is a fragmentary enlarged side elevational view.

The frame-work 18 in addition to the members 3 and 4 comprises a plurality of generally horizontal, transversely, extending fore and aft spaced beam members 19, 19, the members 19 being rigidly clamped to the top flanges 5 and 7 of the members 3 and 4 by means of U-clamps 20 and 21 which are bolted underneath the respective flanges as best seen in FIGURE 3.

The tooth bar members 19 are each angle irons and have a pair of interconnected fore and aft flanges or portions 24 and 25 which diverge downwardly to provide a cavity 26, the apex 27 of the angle being projected upwardly and the lower edges 28 and 29 of the angle iron seating and engaging the upper sides of the top flanges 5 and 7 of the members 3 and 4. Thus a rigid structure is provided constituting the frame-work 18.

Each beam member 19 supports a plurality of spring tooth structures or assemblies generally indicated 30. Each spring tooth assembly comprises a pair of coaxial helical coil portions 31 and 32 and an intervening connector shank portion 33 which adjacent to each end is offset upwardly to provide concavities 34, 35 in which are pocketed the shank portions 36 and 37 of the retainers generally indicated 38, 39. It will be seen that the shank portions 36 and 37 are bowed downwardly and extend transversely of the portion 33 through the concavities 34 and 35 and serve to anchor the structure 30 within the concavity 26 and the opposite ends 40 and 41 of each retainer or bolt is so located that it provides an abutment stop for the cross member 33 and abutment stops are so located in relation to the cross member 33 that in the position shown in full lines in FIGURE 4 the tooth portions 47 and 48 are disposed vertically when the implement is drawn in the direction indicated by the arrow at A in the upper righthand corner of FIGURE 1 and in FIGURE 4 and the teeth 47 and 48 are inclined rearwardly when the implement is drawn in a direction represented by the arrow B on the left side of FIGURE 1 and in FIGURE 5.

It will be seen that in each instance the spring portions are acted on torsionally in view of the reactions of the coils at 50 against the inner face 51 of the flange 24 intermediate its upper and lower extremities when drawn as indicated by arrow A and the reaction to the coil portions at 52 against the inner side 53 of flange 25 intermediate the apex 27 and the lower edge 29 of flange 25 when drawn as indicated by arrow B.

It will also be seen that the arrangement and the placement of the cross bar and the stops is such that the tooth portions 47 and 48 at their juncture with the endmost coils 55 and 56 are spaced an appreciable distance from the flange toward which the tooth portions 47 and 48 are being flexed.

Preferably the convolutions of the spiralling of the coil portions 31 and 32 are in the same direction so that in one direction the coils are wound up and in the other direction unwound.

Figure 4:
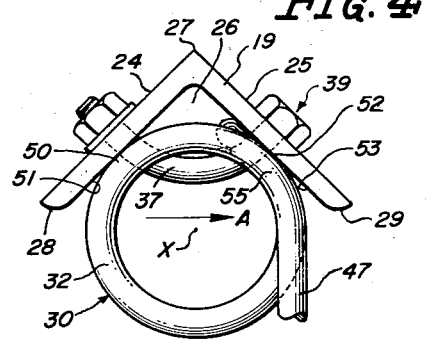
FIGURE 4 is an enlarged fragmentary end elevational view of the spring tooth assembly and tooth bar.
Figure 5:
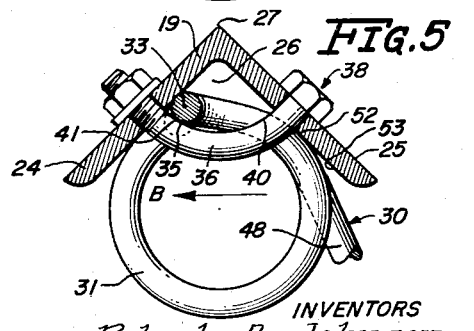
FIGURE 5 is an enlarged cross sectional view taken substantially on the line 5—5 of FIGURE 2.

It will be seen that the center of rotation indicated at X, FIGURE 4, of the tooth assemblies is below the tooth bar and that the coils are confined a substantial extent so as to control the flexing thereof and provide adequate support therefor. In addition the connection of the tooth structure is such that both teeth are reactably interconnected through the center bar portion 33 because the connection of the tooth assembly is not rigid with respect to the tooth bar. Thus if one coil for some reason becomes slightly disaligned its reaction would be directed to the other coil. Thus excessive forces which would tend to destroy the defective coil would be imposed upon the other coil so that both coils are mutually assisting.

It will be understood that the foregoing structure has been chosen by way of illustration and that various other forms of the invention will become readily apparent to those skilled in the art within the scope of the appended claims.

What is claimed is:

1. In a spring tooth harrow comprising a frame including a longitudinal connecting member, a beam member extending transversely of said connecting member, means interconnecting said members, means at opposite ends of the frame for attaching the implement to be drawn in opposite directions over the ground, a tooth structure freely pivoted to said beam member on an axis transverse to said connecting member, abutment means on one of said members cooperatively associated with the tooth structure to prevent pivotal movement of the tooth structure relative to said beam member beyond a first limit position and a second limit position upon said frame being drawn respectively in opposite directions, and said beam member being an angle structure including a pair of downwardly diverging flanges defining a pocket therebetween and said tooth structure comprising a pair of axially aligned coil portions and an intervening connector element and tooth portions extending downwardly from the endmost convolutions of said coil portions, said abutment means comprising an arcuate mounting means extending through both flanges beneath the connector element for securing the tooth structure to the beam member, said tooth structure engaging said element with the mounting means in each of said positions of the structure.

2. In a tooth mounting for a spring tooth harrow, the combination of a beam member having a downwardly facing concavity defined at least in part by portions of said member spaced transversely thereof, a tooth structure including a pair of coaxial coils and an intervening elongated connector element, said coils disposed within the cavity in circumferential sliding engagement at opposite sides with respective beam portions, and securing means connecting said tooth structure to the beam member extending through said beam portions beneath said element and affording abutment stops therefor to limit pivotal movement of the tooth structure in either direction of movement thereof circumferentially of the coils, and a tooth on the endmost convolution of each coil extending downwardly therefrom.

3. The invention according to claim 2 wherein said connector element is offset to provide a recess receiving said securing means and in axial abutment therewith to prevent displacement axially of the beam member.

4. In an implement of the spring tooth harrow type, a plurality of longitudinal connecting members, means for attaching the implement at opposite ends to be drawn across the ground in opposite directions, a series of beams extending transversely of said connecting members, means fixedly securing said beams to said connecting members, each said beams comprising opposing portions defining a downwardly facing pocket, a plurality of spaced coil spring tooth structures freely pivotal within the beams on an axis transverse to said directions of movement of the implement, each tooth structure having a helical coil extending axially generally parallel to the associated beam and having an outer periphery in engagement with said portions and bodily movable thereagainst in an unstressed condition, and downwardly extending teeth on said coil, and means connected to said portions and extending beneath each tooth structure and engaging portions of the tooth structure and providing abutments limiting circumferential movement thereof.

5. A spring tooth harrow implement comprising a frame including a plurality of transverse beam members, said frame having means at opposite ends for attaching the implement to be drawn in opposite directions over the ground, each said member comprising an angle structure having an upwardly directed apex and a pair of fore and aft flanges diverging downwardly from the apex and providing a downwardly open pocket, a plurality of spring tooth assemblies mounted upon each beam member, each assembly comprising a pair of end to end disposed substantially coaxial coil portions and an intervening elongated connector element interconnecting said coils and disposed adjacent to the outer peripheries thereof, said coils extending into the cavity and engaging at opposite sides respective flanges, and securing means in the form of curved bolts extending through openings in said flanges and disposed beneath each connector adjacent to each coil, said bolts convexed downwardly and accommodating limited pivotal movement of the tooth structures and teeth extending from the outermost convolution of said coils and disposed with respect to said connector in such position that when the implement is drawn in one direction the teeth are disposed vertically and the connector abuts one of the ends of the bolts and when the implement is drawn in the opposite direction and the connector abuts the other of the ends of the bolts said teeth are inclined rearwardly.

6. In a spring tooth structure mounting for a harrow, the combination of a frame having means at opposite ends for attaching the harrow to be drawn in opposite directions, said frame including at least one transverse angle beam having an upward directed apex and a pair of fore and aft flanges diverging downwardly from the apex and providing a pocket, a coil spring tooth structure having a pair of coaxial helical axially spaced coil spring portions and an intervening integral connector element along one side of the coils, said coils disposed within the pocket in engagement at spaced points with respective flanges, integral teeth extending downwardly from the endmost convolutions of the coils, and means fastened to said flanges and extending beneath said connector for securing said structure to said beam and spaced below said connector when said connector is medially between said flanges and engageable by the connector upon said implement being drawn in either direction whereupon said connector is caused to engage said means and the flange opposite to the direction of traverse of the implement to limit pivotal movement of the structure.

7. The invention according to claim 6 wherein said connector is curved downwardly between said flanges in clearing relation to the connector to accommodate movement thereof toward either flange.

References Cited in the file of this patent

UNITED STATES PATENTS

| 1,950,834 | Wyss | Mar. 13, 1934 |
| 2,826,027 | Melroe | Mar. 11, 1958 |

FOREIGN PATENTS

| 87,909 | Switzerland | Jan. 17, 1921 |